United States Patent [19]

Buchanan

[11] Patent Number: 4,815,766
[45] Date of Patent: Mar. 28, 1989

[54] RE-USABLE TEST BOOKLET

[75] Inventor: William W. Buchanan, Arlington, Va.

[73] Assignee: Tescor, Inc., Herndon, Va.

[21] Appl. No.: 55,727

[22] Filed: May 29, 1987

[51] Int. Cl.⁴ .................. B42D 11/00; B42D 1/00; G09B 19/08; G09B 19/24

[52] U.S. Cl. .................. 281/26; 281/15 R; 283/45; 283/49

[58] Field of Search ............ 281/15 R, 26; 283/4, 283/42, 43, 45, 48 R, 49, 50; 435/805

[56] References Cited

U.S. PATENT DOCUMENTS

| | | | |
|---|---|---|---|
| 1,500,777 | 7/1924 | Stevenson | 281/15 R |
| 1,539,397 | 5/1925 | Matravers | 281/15 R |
| 1,545,217 | 7/1925 | Turber | 283/45 |
| 1,837,742 | 12/1931 | Wiley | 281/15 R |
| 2,563,294 | 8/1951 | Welch | 283/50 |
| 4,165,878 | 8/1979 | Frain | 283/49 |

Primary Examiner—Frank T. Yost
Assistant Examiner—Paul M. Heyrana, Sr.
Attorney, Agent, or Firm—Kokjer, Kircher, Bradley, Wharton, Bowman & Johnson

[57] ABSTRACT

A re-usable examination booklet for the administration of written tests includes overlaid question sheets bound together with the unbound edge of each sheet overlapping the underlying sheet. An answer sheet may be inserted in the booklet beneath the question sheets. Answer areas on the answer sheet are arranged in columns extending along the unbound edges of the question sheets to locate the answer areas in close proximity to the corresponding questions on the question sheets. A modified booklet includes question sheets having openings arranged in columns extending along their unbound edges so that the selected answers can be marked through the openings onto the answer areas of the answer sheet.

6 Claims, 2 Drawing Sheets

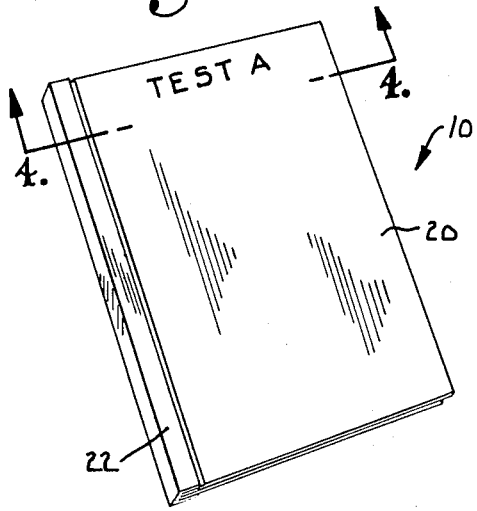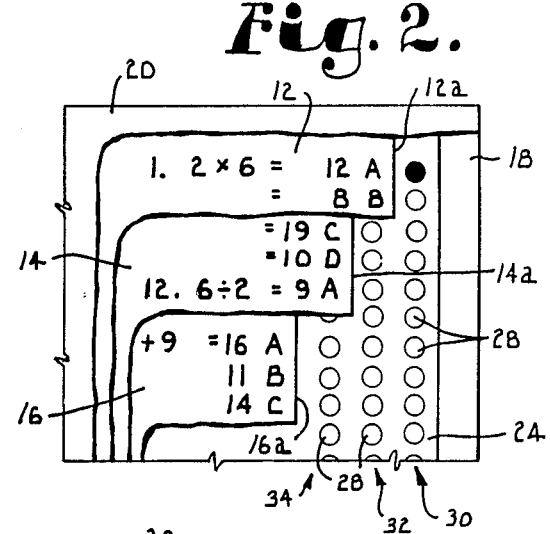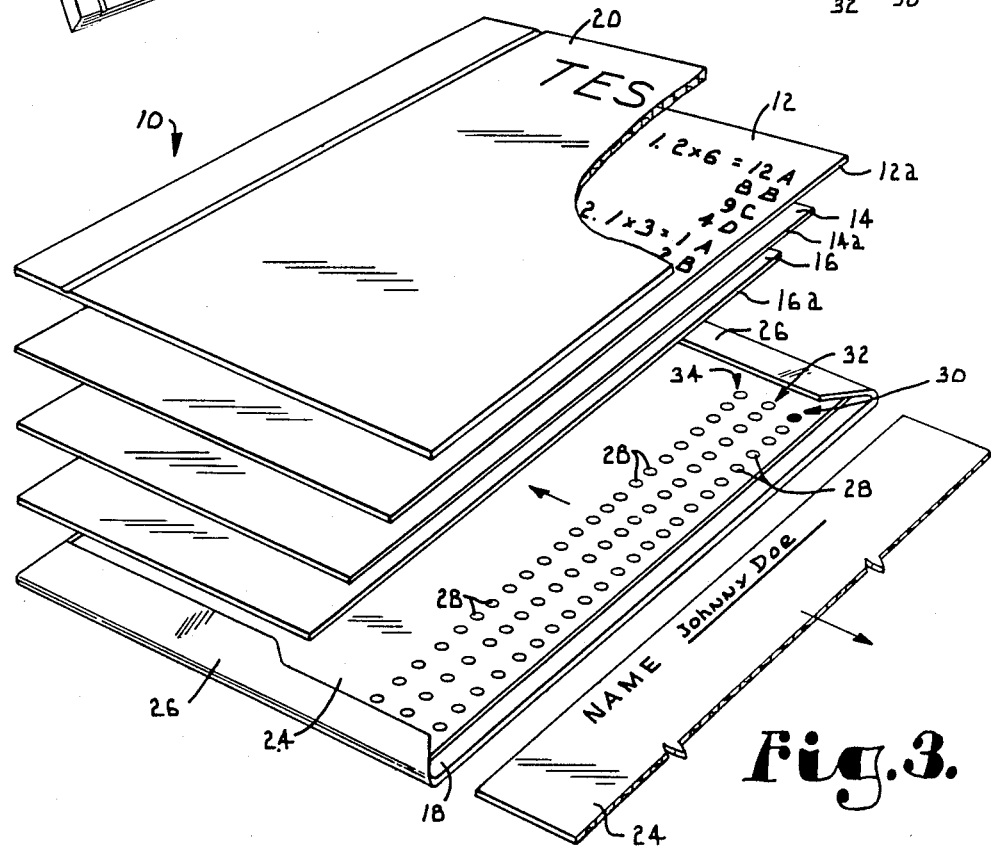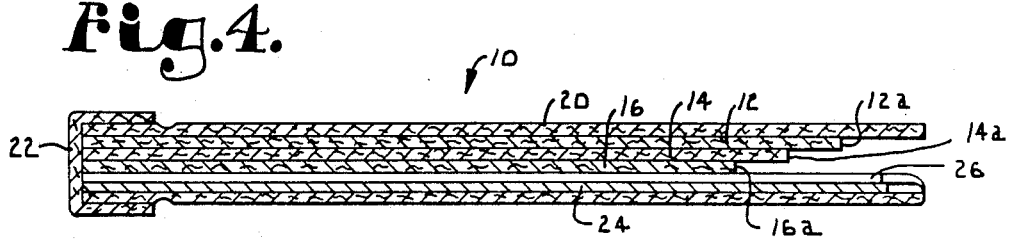

RE-USABLE TEST BOOKLET

BACKGROUND AND SUMMARY OF THE INVENTION

This invention relates generally to the field of written tests and more particularly to a re-usable test booklet having an improved construction.

Written examinations are widely administered in schools and other educational institutions, as well as in various businesses and governmental bodies. So called objective tests include questions which are answered by selecting one of several possible "multiple choice" answers or by deciding whether a statement is true or false. Typically, such objective tests include a question booklet and a separate answer sheet on which the answers to the multiple choice or true-false questions are marked by blanking out an answer area corresponding to the answer that is selected. The completed answer sheet is usually processed by machine in order to facilitate and expedite scoring of the test results.

Although this type of test has long been used and is generally satisfactory, it has not been wholly free of problems. One problem with the conventional test format is that the areas on the answer sheet must be properly matched with the corresponding questions, usually by matching the number of the question with the number associated with the possible answers on the answer sheet. If the person taking the test inadvertently mismatches the question and answer numbers, the answer will be recorded in the improper place even though the examinee in fact knows the correct answer. Thus, incorrect answers often result from mechanical errors in recording the answers rather than from lack of knowledge of the correct answer, and the test results can reflect wrong answers caused by the mechanics of the answer recording procedure.

When a large number of questions are included in a particular examination, it is especially likely that one or more answers will be entered incorrectly for mechanical reasons rather than by reason of lack of knowledge. It is not uncommon for an examinee to temporarily skip a particularly difficult question, intending to return to it if time permits. The answer area corresponding to the skipped question may be inadvertently marked with the answer to the immediately following question, and the examinee may continue to mark the answers to successive questions in the wrong answer spaces all because of the skipping of one question. Even if the error is discovered, correction requires that a large number of answers be changed and this may not be possible due to time constraints. Even if the answers are corrected, considerable time is required that could otherwise be put to more productive substantive use. The test results in such cases do not accurately reflect the examinee's knowledge of the subject matter and thus do not validly test what is intended to be tested.

Although this shortcoming applies to all levels of testing, its impact is so great in elementary schools that tests with separate scorable single answer sheets are not used from kindergarten through third grade.

Instead, schools pay extremely high prices for machine-readable test booklets which require the examinee to fill in bubbles on the test pages themselves. This increases the costs of testing programs because the booklets cannot be used more than once.

Moreover, each page (often containing only 4 to 8 questions and answers) has to be cut away from the booklet and run through a scanner separately. This means that scoring a 40 page test requires the steps of (1) cutting up the booklet into separate pages, and (2) scanning 40 sheets instead of one (or 20 sheets where scanners are used which can read both sides of an answer page in one pass). In addition to the extra expense, time, and effort consumed in handling these booklets, there is also the possibility that the pages will be mishandled and then processed through the scanner in the improper sequence. This, of course, throws off the scoring of the test, and if not detected, will have serious negative grading results for the examinee. Even in those cases where such errors are discovered, the re-running and correction efforts are time-consuming.

Due to these shortcomings in the conventional test format and the single-use scannable test booklets, it is evident that a need exists for an examination scheme that more reliably matches the questions with the possible answers on a separate answer sheet. The present invention is aimed primarily at providing a test format that is improved in this respect compared to conventional formats.

More specifically, the present invention provides a test booklet which includes a plurality of bound together question sheets and an answer sheet that may be placed in the booklet beneath the question sheets. The question sheets are progressively narrower from top to bottom so that each question sheet has an unbound edge portion that overlaps the underlying question sheet. The answer areas on the answer sheet are arranged in a plurality of columns equal in number to the number of question sheets in the booklet. The answer sheet columns are located adjacent to the unbound edges of the question sheets to which they correspond.

In one form of the invention, each column of answer areas extends generally along and adjacent to the edge of the question sheet to which it corresponds. Each group of possible answers is thus located adjacent to the corresponding question on the question sheet, and the physical location of the answer areas next to each question provides a clear indication as to which answer areas apply to which questions. At the same time, the overlapping edges of the question sheets cover the answers applicable to underlying question sheets, so the questions and the applicable answer areas are matched by their physical locations, and there is very little chance of error resulting from mechanical problems involving marking of the answers in the wrong place.

A second form of the invention is similar to the first form, except that the answer areas register with a column of openings formed in the question sheets along their free edges. This arrangement makes it even less likely that the wrong column of possible answers will be inadvertently marked with answers because the examinee can be assured that the correct column is being used simply by being careful to mark through one of the openings adjacent to the question that is being answered.

DESCRIPTION OF THE DRAWINGS

In the accompanying drawings which form a part of the specification and are to be read in conjunction therewith and in which like reference numerals are used to indicate like parts in the various views:

FIG. 1 is a perspective view of a test booklet constructed according to one embodiment of the present invention;

FIG. 2 is a fragmentary plan view of the test booklet shown in FIG. 1, with portions of each sheet in the booklet broken away for purposes of illustration;

FIG. 3 is an exploded perspective view of the test booklet showing the manner in which the sheets are arranged relative to one another, with a portion of the cover broken away for purposes of illustration;

FIG. 4 is a fragmentary sectional view on an enlarged scale taken generally along line 4—4 of FIG. 1 in the direction of the arrows;

DETAILED DESCRIPTION OF THE INVENTION

Figure 5:
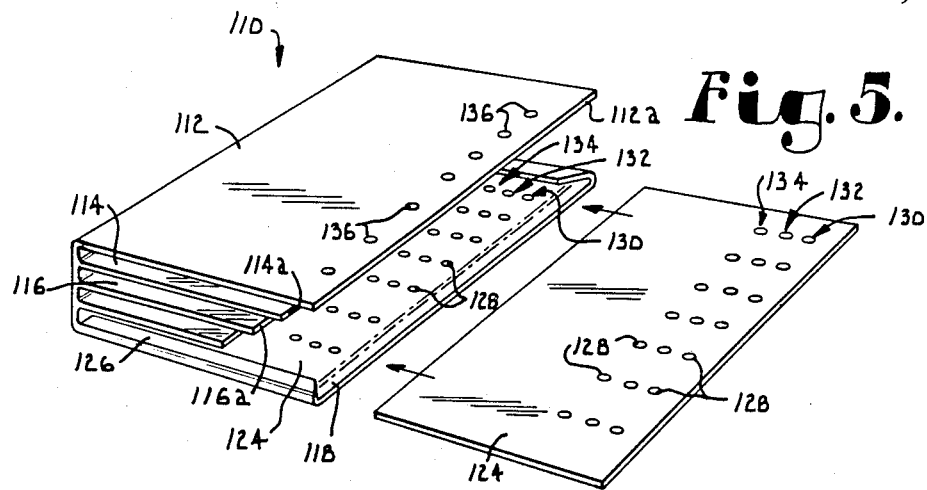
FIG. 5 is a perspective view diagrammatically showing a test booklet constructed according to a second embodiment of the invention.
Figure 6:
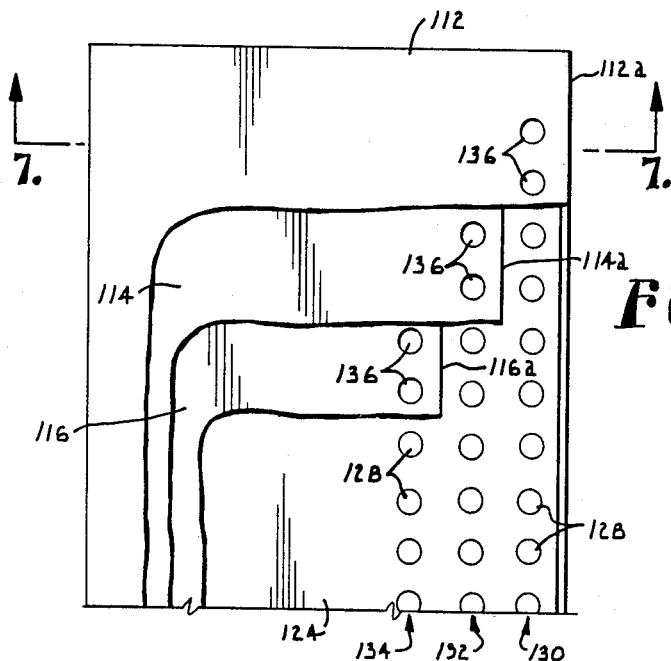
FIG. 6 is a fragmentary plan view of the test booklet shown in FIG. 5, with portions of the sheets of the test booklet broken away for purposes of illustration.
Figure 7:
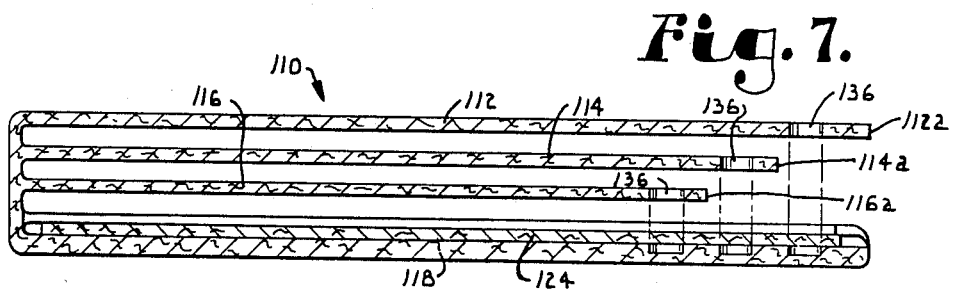
FIG. 7 is a fragmentary sectional view on an enlarged scale taken generally along line 7—7 of FIG. 6 in the direction of the arrows.

Referring now to the drawings in more detail and initially to FIGS. 1-4, numeral 10 generally designates a test booklet constructed in accordance with one form of the present invention. The test booklet 10 is used in the administration of written examinations and includes a plurality of overlaid question sheets 12, 14 and 16 which contain the written questions included in the examination. The question sheets 12, 14 and 16 are laid upon a backing 18 and are overlaid by a cover 20 which may include printed material identifying the examination. The question sheets and the back 18 and cover 20 are all rectangular and are bound together in booklet form by a binder 22.

The question sheets all have the same length but are progressively narrower from top to bottom. Thus, the top question sheet 12 is somewhat wider than the center sheet 14 which is in turn somewhat wider than the bottom sheet 16. The top sheet 12 has a free unbound edge 12a which is opposite its bound edge and which overlaps the underlying sheet 14 due to the greater width of sheet 12. The intermediate sheet 14 likewise has a free unbound edge 14a which overlaps the unbound edge 16a of the bottom sheet 16. Preferably, the cover 20 and back 18 are somewhat longer and somewhat wider than the question sheets.

As previously indicated, each of the question sheets includes a plurality of printed questions which are printed one after another from top to bottom on the question sheets and are numbered consecutively. For example, question number 1 is printed on the top question sheet 12 near its top and, for purposes of illustration, may be a mathematical problem (such as 2×6). If the question is a multiple choice question, then a plurality of possible answers are printed on the question sheet immediately following the question and may be given the letters A, B, C, D (more or fewer possible answers may be given). The possible answers are arranged consecutively in a column extending along the free edge 12a of sheet 12. Subsequent questions are printed on sheet 12 following question number 1, and the possible answers to each question are similarly printed in a column extending generally along edge 12a. The subsequent question sheets 14 and 16 are similarly imprinted with questions which are consecutively numbered and which have their possible answer groups printed in columns extending generally along the edges 14a and 16a.

The test booklet 10 includes a removable answer sheet 24 which may be inserted beneath all of the question sheets 12-16 on top of the back 18. The back 18 is provided with flaps 26 on its top and bottom edges in order to permit the answer sheet 24 to be slid onto sheet 18 within the flaps 26 until the leading edge of the answer sheet is stopped by the binding 22.

The answer sheet 24 is provided with a plurality of individual answer areas which take the form of circles 28. The circles 28 may be blacked out with a pencil or other writing instrument to indicate that particular answer area is selected as the answer to the corresponding question. The circles 28 are arranged in three separate columns 30, 32, and 34 which are spaced apart and parallel to one another. As best shown in FIG. 2, the circles in column 30 are located to lie generally along and immediately outwardly of edge 12a when the answer sheet is inserted in the booklet. Each individual circle 28 is thus located adjacent to one of the possible answers (A, B, C, D) imprinted on the question sheet 12. Column 32 is similarly located such that it lies generally along and outwardly of edge 14a, with the individual circles 28 in column 32 located adjacent to the possible answers imprinted on question sheet 14. Column 34 extends generally along and outwardly of edge 16a with its circles located adjacent to the possible answers imprinted on sheet 16. The answer sheet 24 may include spaces for identifying material such as the name and other data relating to the examinee.

In use of the test booklet 10, the answer sheet 24 is slipped into place within the flaps 26 at the start of the examination. The answer sheet may be preprinted with magnetized "skunk marks" and "timing tracks" as is common practice for use with optical mark readers OMR, or other types of scanners. The cover 20 completely overlaps the answer sheet so that none of the possible answers and none of the question sheets are accessible when the cover is closed. At the start of the examination, the examinee opens the cover 20 by opening it flat or by folding it about the binding 22, and this exposes the first question sheet 12 along with the first column 30 of answer circles 28. The examinee proceeds through the questions and answers them by filling in the circle 28 which corresponds to the selected answer. For example, the answer to question number 1 (2×6) is the number 12 which is identified as answer A to question number 1. Question number 1 may be correctly answered by blackening in the circle 28 which is located adjacent to answer A, as shown in FIG. 2. The examinee progresses through the questions, usually in the order presented although they can be answered in any order.

It is noted that sheet 12 completely covers the underlying sheets 14 and 16 and the second and third columns 32 and 34. When the examinee has finished answering the questions on the first sheet 12, sheet 12 can be displaced by opening it flat or by folding it about the binding 22. This exposes the underlying sheet 14 and the second column 32 which extends generally along the free edge 14a of the second sheet. The questions on the second sheet 14 are answered in the same fashion as those on the first sheet by filling in the circles 28 in column 32 which correspond to the selected answers. When the second sheet 14 is being worked on, it completely covers the underlying sheet 16 and the third column 34 of possible answers.

When the second sheet 14 has been completed, it is displaced by opening it or by folding it about the binding 22, thus exposing the third sheet 16 and the third column 34. Answering of the questions on the third sheet proceeds in the same manner previously discussed. It should be noted that the booklet 10 may be provided with virtually any number of question sheets and that the three sheets shown in the drawings are for illustrative purposes only.

Because the circles 28 are located immediately adjacent to the possible answers (A, B, C, D), there is virtually no possibility that the examinee will mark the selected answers in the wrong column or other inappropriate place. Thus, fewer mechanical problems are encountered in recording the answers than have been encountered with conventional test formats. It is noted that each question sheet covers the underlying question sheets and the columns of answer areas which correspond to the underlying question sheets. When the test has been completed, the answer sheet can be turned in and scored by conventional hand scoring or machine scoring processes.

FIG. 5 depicts a test booklet 110 which is constructed in a manner similar to the test booklet 10 in many respects. Test booklet 110 includes a plurality of overlaid answer sheets 112, 114, and 116 which may be imprinted with questions and possible answers in the same manner as sheets 12, 14 and 16. Underlying the question sheets is a backing 118 which may receive a removable answer sheet 124 which may be slipped into flaps 126 extending from the back. Answer sheet 124 is similar to answer sheet 24 and includes three columns 130, 132 and 134 each containing a plurality of possible answer areas in the form of circles 128. The test booklet 110 may have a cover sheet if desired.

The question sheets 112, 114, and 116 differ from the question sheets described previously in that each question sheet is provided with a plurality of openings 136 (which may or may not be reinforced) which extend in a straight column adjacent to the free edges 112a, 114a, and 116a. The openings 136 in sheet 112 are located to overlie the respective circles 128 in the first row 130 on the answer sheet. The openings 136 in the second sheet 114 are located to immediately overlie the respective circles 128 in the second column 132, and the openings 136 in the third sheet 116 are located to overlie the respective circles 128 in the third column 134.

The test booklet 110 is used in substantially the same manner as booklet 10. The only difference is that the examinee marks through a selected opening 136 each time an answer is selected. By marking through the opening 136 that corresponds to the selected answer, the underlying circle 128 is filled in to record the answer.

Answers that are recorded to the questions on the first sheet 112 are marked in the first column 130 due to its location below the column of openings on sheet 112. Answers that are marked through the openings 136 in the second sheet 114 are marked in the second column 132 of circles due to its location beneath the column of openings in sheet 114. Finally, the answers that are marked through the openings in the bottom sheet 116 are marked in the third column 134 due to its location beneath the column of openings in sheet of 116. When the examination has been completed, the answer sheet 124 may be hand scored or machine scored in a conventional manner.

The test booklet 110 differs from booklet 10 by virtue of the inclusion of the openings 136 through which the selected answers are marked. Because it is a simple matter to make certain that openings are marked through when answering questions, there is little if any chance that an examinee will inadvertently mark an answer in the wrong column or in the wrong place on the correct column. Accordingly, booklet 110 provides even more of a safety factor with respect to assuring correct placement of the answers than booklet 10. The staggering of edges of 112a, 14a, and 116a results in each question sheet covering the underlying question sheet and its openings 136, as well as the column of circles 128 which correspond to the underlying sheets. The edges of the question sheets may be reinforced in the areas containing the holes in order to better withstand the repeated cleaning or erasing of "smudge" marks which may be caused by the examinee inadvertently touching the side of the hole with the side of the pencil point (or other marking instrument).

It is again noted that virtually any number of question sheets may be provided. It should also be pointed out that "true-false" questions can be presented in the test booklet in substantially the same manner as multiple choice questions, except that each true-false question will have only two possible answers, true (T) or false (F). Other types of objective tests can also be presented.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention I claim:

1. A machine-scorable test format comprising:
    a plurality of overlaid question sheets each containing test questions and each having an edge portion, said question sheets differing in width and being arranged with the edge portion of each sheet overlapping the edge portion of the immediately underlying question sheet; and
    a machine-scorable answer sheet underlying said question sheets and presenting a plurality of spaced apart columns of answer areas equal at least in number to the question sheets and extending generally along the edge portions of the respective question sheets, each column including a plurality of groups of answer areas accessible for marking of answers thereon when the question sheets which overlie the question sheet corresponding to the column are displaced from an overlying position thereto, each group of answer areas corresponding to a different one of the test questions and each group including a plurality of answer areas each of which may be marked in answer to the corresponding test question in a manner permitting the answer sheet to be scored by a machine.

2. The invention of claim 1, wherein said question sheets are bound together in booklet form.

3. The invention of claim 1, wherein said columns are located to extend adjacent to and outwardly of said edge portions of the corresponding answer sheets.

4. The invention of claim 1, including a column of openings in each question sheet arranged thereon to register with the column of answer areas corresponding to the question sheet, whereby the openings in each question sheet can be marked through to mark on the answer sheet when overlying question sheets are displaced.

5. A machine-scorable test booklet comprising:
  a plurality of overlaid question sheets each containing test questions and each having a free edge, said question sheets being bound together in booklet form with the free edges thereof staggered such that the free edge of each sheet overlaps the free edge of the immediately underlying sheet;
  an answer sheet in the booklet beneath the question sheets;
  a plurality of spaced apart columns of answer areas on said answer sheet, said columns being located to extend generally along and outwardly of the free edges of the respective question sheets whereby each column is accessible adjacent the free edges of the corresponding question sheet to have answers marked thereon only when the overlying question sheets are displaced from said corresponding question sheet; and
  each column being arranged in a plurality of groups of answer areas with each group corresponding to a different one of the test questions, each group including a plurality of answer areas each of which may be marked in a machine readable manner as the selected answer to the corresponding test question.

6. A machine-scorable test booklet comprising:
  a plurality of question sheets bound together in booklet form overlying one another, each question sheet containing test questions and having a column of openings through which answers to the test questions can be marked, said column of openings on each sheet being offset from and parallel to the columns on the other sheets and each column being accessible only when the overlying question sheets are displaced;
  each column having a plurality of groups of openings with each group corresponding to a different one of the test questions and each group including a plurality of openings each of which represents a possible answer to the corresponding question; and
  a machine-scorable answer sheet in the booklet beneath the question sheets, said answer sheet presenting a plurality of columns of answer areas located to underlie the respective columns of openings so that the answer areas can be marked through the openings in a manner permitting the answer sheet to be machine scored.

* * * * *